(12) United States Patent
Matsuo et al.

(10) Patent No.: US 7,089,431 B2
(45) Date of Patent: Aug. 8, 2006

(54) DATA PROCESSING SYSTEM FOR REDUCING WASTEFUL POWER CONSUMPTION

(75) Inventors: Masatoshi Matsuo, Fukuoka (JP);
Youichi Nishida, Kasuya-Gun (JP);
Takashi Hashimoto, Fukuoka (JP);
Masahiro Ohashi, Kasuya-Gun (JP);
Hiroto Tomita, Iizuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 474 days.

(21) Appl. No.: 10/352,850

(22) Filed: Jan. 29, 2003

(65) Prior Publication Data

US 2003/0159077 A1    Aug. 21, 2003

(30) Foreign Application Priority Data

Jan. 30, 2002    (JP) .............................. 2002-021440

(51) Int. Cl.
*G06F 1/26* (2006.01)
*G06F 1/32* (2006.01)

(52) U.S. Cl. ........................ 713/300; 713/320; 345/503
(58) Field of Classification Search ................ 713/300, 713/320; 345/503
See application file for complete search history.

(56) References Cited

U.S. PATENT DOCUMENTS

| 5,450,003 | A | | 9/1995 | Cheon | |
|---|---|---|---|---|---|
| 5,874,988 | A | * | 2/1999 | Gu | ............... 348/97 |
| 5,943,064 | A | * | 8/1999 | Hong | ......................... 345/546 |
| 6,501,999 | B1 | * | 12/2002 | Cai | ............................. 700/82 |
| 6,624,816 | B1 | * | 9/2003 | Jones, Jr. | ..................... 345/503 |
| 6,910,139 | B1 | * | 6/2005 | Ishidera | ...................... 713/320 |

FOREIGN PATENT DOCUMENTS

JP    2002-218539    *    8/2002

* cited by examiner

*Primary Examiner*—Chun Cao
(74) *Attorney, Agent, or Firm*—Wenderoth, Lind & Ponack, L.L.P.

(57) ABSTRACT

An image processing unit decodes coded data that have been coded and synthesizes the decoded moving image with graphics data. In a case where only graphics data are to be displayed, a bypass unit outputs the graphics data to a display device without use of an image processing unit. A control unit performs control of the supplying of a power supply voltage and a clock to a region containing the image processing unit and performs control of the bypass unit. If processing at the image processing unit is unnecessary, the supply of a power supply voltage or the supply of a clock to the region containing the image processing unit is stopped so as to stop the region and enable reduction of wasteful power consumption.

13 Claims, 6 Drawing Sheets

DATA PROCESSING SYSTEM FOR REDUCING WASTEFUL POWER CONSUMPTION

BACKGROUND OF THE INVENTION

1. Field of the Invention

The present invention concerns a data processing system comprising a plurality of data processing units that operate independent of each other.

2. Description of the Related Art

Examples of a data processing system, comprising a plurality of data processing units that operate independent of each other, include portable terminals, such as portable phones that are enabled to perform moving image communication.

With progresses in the furnishing of a high-speed communication infrastructure for third-generation mobile communication, etc. in recent years, the transmittable amount of information has increased significantly and moving image communication has become possible.

In accompaniment, the display functions of a portable terminal, such as a portable telephone, etc., are changing from those that are mainly for graphics display, such as the display of the time, menus, remaining battery quantity, etc. to those for moving image displays, such as synthesized images of moving images and graphics, etc.

Generally, an enormous amount of data is processed in the data processing of a moving image. Thus, when all processes, including moving image processes, are to be performed by a single data processing unit, such as a general-purpose processor, etc., the data processing unit is required to exhibit an extremely high performance.

Thus, in many cases, a data processing unit that satisfies the required performance either does not exist or the realization of a data processing unit that satisfies the required performance is difficult to attain.

Conventional portable terminals are thus equipped with a separate data processing unit or LSI (large scale integrated circuit) that is dedicated to moving image processing.

As prior-art examples, an arrangement of a display system of a portable terminal that performs only graphics display is shown in FIG. 6, and an arrangement of a display system of a portable terminal that is enabled to perform moving image communication is shown in FIG. 7.

Presently for moving image communication by a portable terminal, MPEG-4, which is an international standard for high-efficiency moving image coding, is most likely to be used.

In many cases, a MPEG-4 moving image data processing unit is equipped with on-screen display (OSD) functions for handling graphics, functions for synthesizing moving image data and graphics data, and functions for outputting image data to a display data processing unit.

Prior-art portable terminal display systems shall now be described with reference to FIGS. 6 and 7.

As shown in FIG. 6, a display system that performs only graphics display comprises, in outline, a CPU (central processing unit) 302, a display device 303, a voltage regulating device 311, and a clock generating device 312.

A CPU 302 generates graphics data to be displayed. The display device 303 displays the graphics data output from the CPU 302.

The voltage regulating device 311 supplies optimal power supply voltages from a system power supply 324 to the CPU 302 and display device 303. The clock generating device 312 supplies clocks to the CPU 302 and display device 303.

The CPU 302 operates by a power supply voltage 325, which is supplied from the voltage regulating device 311, and a clock 329, which is supplied from the clock generating device 312.

The display device 303 operates by a power supply voltage 328, which is supplied from the voltage regulating device 311, and a clock 332, which is supplied from the clock generating device 312.

The flow of the processes of the display system of FIG. 6 shall now be described.

The graphics data to be displayed by the display device 303 is output as output data 314 from the CPU 302 to the display device 303.

The graphics data that are output are graphics data concerning a menu display, time display, etc.

These graphics data are input directly as an external input 313.

Alternatively, these graphics data are stored inside the CPU 302 in advance and output to and displayed by the display device 303 in accordance with information input as the external input 313.

As shown in FIG. 7, a portable terminal display system that can perform moving image communication comprises, in outline, an image processing LSI 401, a display device 103, a CPU 102, a voltage regulating device 111, and a clock generating device 112.

The image processing LSI 401 has the functions of decoding coded data that have been coded in accordance with the MPEG-4 coding method and synthesizing the decoded moving image with graphics data.

The display device 103 displays the display image data generated by the image processing LSI 401.

The CPU 102 prepares graphics data to be displayed on the display device 103 and sends these data to the image processing LSI 401.

Also, when a moving image is to be displayed on the display device 103, the CPU 102 sends the coded data of the moving image to be displayed to the image processing LSI 401.

The voltage regulating device 111 supplies optimal power supply voltages from the system power supply 124 to the image processing LSI 401, CPU 102, and display device 103.

The clock generating device 112 supplies clocks to the image processing LSI 401, CPU 102, and display device 103.

The CPU 102 operates by a power supply voltage 125, which is supplied from the voltage regulating device 111, and a clock 129, which is supplied from clock generating device 112.

The image processing LSI 401 operates by a power supply voltage 426, which is supplied from the voltage regulating device 111, and a clock 430, which is supplied from the clock generating device 112.

The display device 103 operates by a power supply voltage 128, which is supplied from the voltage regulating device 111, and a clock 132, which is supplied from the clock generating device 112.

The flow of the processes of the display system of FIG. 7 shall now be described.

The CPU 102 outputs graphics data, concerning the time, menus, etc., as well as bit stream data, which are MPEG-4 coded data, to the image processing LSI 401 as output data 414.

The graphics data and the MPEG-4 coded data, which are moving image data, output to image processing LSI 401 are input into CPU 102 as an external input 113.

Alternatively, these data are stored in the interior of the CPU 102 in advance and output in accordance with information input from the external input 113.

At the image processing LSI 401, the MPEG-4 coded data are decoded and reconfigured as an image at the image processing unit 404.

The process of synthesizing the decoded image data and the graphics data input from the CPU 102 is then performed at the image processing unit 404.

The display data resulting from image synthesis are then output to display the device 103 as output data 418 of the image processing LSI 401.

The display device 103 performs screen display based on the display data.

However, in general, even with a portable terminal that is enabled to perform moving image communication, the displays will mainly be displays besides moving images, such as a time display, menu displays, etc.

In such cases, moving image data processing is not necessary and only graphics data are displayed.

Thus, with a prior-art data processing system having an arrangement such as that shown in FIG., 7, only graphics data will be output from the CPU 102.

In addition, at the image processing unit 404 inside the image processing LSI 401, the decoding of MPEG-4 coded data and the synthesizing of a decoded image with graphics data are not performed and the graphics data are output as they are as display data to the display device 103.

Although the realization of low power consumption is an important theme for battery-driven portable terminals, with the prior-art data processing system shown in FIG. 7, power and clocks are supplied to the MPEG-4 image processing parts (moving image decoding process part and synthesizing process part) inside the image processing unit 404 even when only graphics data are output.

There is thus the problem in that power is consumed wastefully in the form of unnecessary power consumption by the charging and discharging of a clock line and power consumption due to leak currents in the standby state.

OBJECTS AND SUMMARY OF THE INVENTION

Thus an object of the present invention is to provide a data processing system that enables a reduction of wasteful power consumption.

A data processing system of a first aspect of the present invention comprises at least one first data processing unit for performing preprocessing and outputting preprocessed data, at least one second data processing unit for performing data processing on the preprocessed data and outputting processing result data, at least one third data processing unit for performing postprocessing on the processing result data, a bypass unit for transferring the preprocessed data input from the first data processing unit to one of the second data processing unit and the third data processing unit, and a control unit for controlling the bypass unit. In a case where processing of the preprocessed data by the second data processing unit is not required, the bypass unit transfers the input preprocessed data to the third data processing unit in accordance with an instruction from the control unit. In a case where processing of the preprocessed data by the second data processing unit is not required, the control unit stops the second data processing unit.

By this arrangement, wasteful power consumption, in the form of unnecessary power consumption by the charging and discharging of a clock line of a specific process executing unit inside a second data processing unit as well as power consumption due to leak currents in the standby state can be reduced.

Thus, for example, the battery duration of a portable terminal that employs this data processing system can be improved.

A second aspect of the present invention provides a data processing system, wherein the above-mentioned second data processing unit and the above-mentioned bypass unit are arranged within a single integrated circuit.

By this arrangement, the system can be made small in mounting area.

A third aspect of the present invention provides a data processing system, wherein the above-mentioned second data processing unit, the above-mentioned bypass unit, and the above-mentioned control unit are arranged within a single integrated circuit.

By this arrangement, the system can be made small in mounting area.

A fourth aspect of the present invention provides a data processing system, wherein the above-mentioned control unit stops the supply of a clock to the above-mentioned second data processing unit to stop the above-mentioned second data processing unit.

A fifth aspect of the present invention provides a data processing system, wherein the above-mentioned control unit stops the supply of a power supply voltage to the above-mentioned second data processing unit to stop the above-mentioned second data processing unit.

A sixth aspect of the present invention provides a data processing system, wherein the above-mentioned control unit stops the supply of a clock and the supply of a power supply voltage to the above-mentioned second data processing unit to stop the above-mentioned second data processing unit.

A seventh aspect of the present invention provides a data processing system, wherein the above-mentioned first data processing unit is a processor.

An eighth aspect of the present invention provides a data processing system, wherein the above-mentioned first data processing unit is a data storage device.

A ninth aspect of the present invention provides a data processing system, wherein the above-mentioned third data processing unit is a display device.

A tenth aspect of the present invention provides a data processing system, wherein the above-mentioned third data processing unit is a data storage device.

The above and other objects, features and advantages of the present invention will become apparent from the following description when read in conjunction with the accompanying drawings, in which like reference numerals designate the same elements.

DETAILED DESCRIPTION OF THE PREFERRED EMBODIMENTS

Embodiments of the present invention shall now be described with reference to the drawings.

First Embodiment

Figure 1:
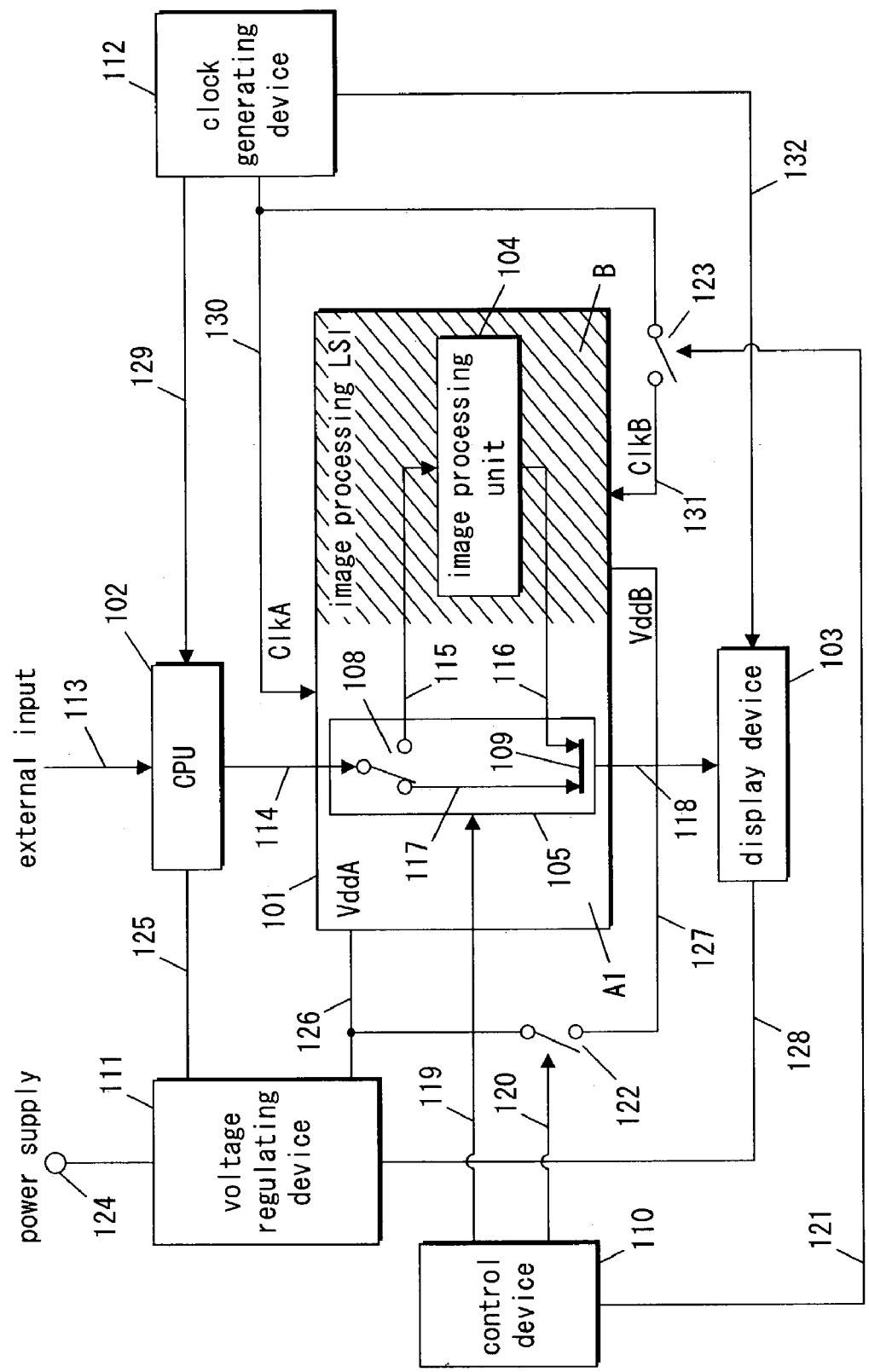
FIG. 1 is a diagram showing the general arrangement of a data processing system of a first embodiment of the present invention.

FIG. 1 is a block diagram, showing the arrangement of a data processing system of a first embodiment of the present invention.

As shown in FIG. 1, this data processing system is equipped with an image processing LSI (large scale integrated circuit) 101, a display device 103, a general-purpose processor (CPU: central processing unit) 102, a voltage regulating device 111, a clock generating device 112, a control device 110, a power supply interrupting unit 122, and a clock interrupting unit 123.

The image processing LSI 101 comprises an image processing unit 104 and a bypass unit 105. The bypass unit 105 comprises a switch 108, a bypass line 117, and a selector 109.

Here, each of the image processing LSI 101, display device 103, and CPU 102 is an example of a data processing unit. Also, the control device 110 is an example of a control unit.

The operations of the above-mentioned components shall now be described.

The image processing unit 104 of the image processing LSI 101 decodes coded data that have been coded in accordance with the MPEG-4 coding method.

The image processing unit 104 then synthesizes the decoded moving image with graphics data.

The bypass unit 105 of the image processing LSI 101 is used when graphics data are to be displayed without using the image processing unit 104.

That is, the bypass unit 105 outputs graphics data upon bypassing the image processing unit 104.

The display device 103 receives the display image data generated at the image processing LSI 101 and displays the received display image data. The display device 103 is, for example, a liquid crystal display, etc.

The CPU 102 prepares graphics data to be displayed on the display device 103 and sends the prepared graphics data to the image processing LSI 101.

Also, when a moving image is to be displayed on the display device 103, the CPU 102 sends the coded data of the moving image to be displayed to the image processing LSI 101.

The voltage regulating device 111 adjusts a voltage generated by a system power supply 124 to appropriate voltages and supplies these appropriate voltages as power supply voltages to the image processing LSI 101, CPU 102, and display device 103.

The clock generating device 112 supplies appropriate clocks to the image processing LSI 101, CPU 102, and display device 103.

The CPU 102 operates by a power supply voltage 125, which is supplied from voltage regulating device 111, and a clock 129, supplied from clock generating device 112.

The display device 103 operates by a power supply voltage 128, which is supplied from the voltage regulating device 111, and a clock 132, which is supplied from the clock generating device 112.

The image processing LSI 101 is divided into the two regions of a region A1, which contains the bypass unit 105, and a region B (slanted line part in FIG. 1), which contains the image processing unit 104.

The region A1, which contains the bypass unit 105, operates by a power supply voltage 126 (power supply voltage VddA), which is supplied from the voltage regulating device 111, and a clock 130 (clock ClkA), which is supplied from the clock generating device 112.

The region B, which contains the image processing unit 104, operates by a power supply voltage 127 (power supply voltage VddB), which is supplied from the voltage regulating device 111, and a clock 131 (clock ClkB), which is supplied from the clock generating device 112.

The control device 110 performs control of the supplying of the power supply voltage 127 (power supply voltage VddB) to region B (slanted line part in FIG. 1) inside the image processing LSI 101, control of the supplying of the clock 131 (clock ClkB) to region B, and control of the bypass unit 105.

The power supply interrupting unit 122 performs interruption of a power supply voltage in accordance with a control signal 120 from the control device 110.

The clock interrupting unit 123 performs interruption of a clock in accordance with a control signal 121 from the control device 110.

The operations of the respective components of the bypass unit 105 shall now be described.

The bypass line 117 outputs output data 114 from the CPU 102 directly to the display device 103.

The switch 108 switches between a path, by which the output data 114 from the CPU 102 are output as input data 115 for the image processing unit 104, and a path, by which the output data 114 from the CPU 102 are output to bypass line 117.

The selector 109 selects between and outputs either the processing result data 116 at the image processing unit 104 or the data output from the bypass line 117.

The switch 108 and selector 109 are controlled by a control signal 119 from the control device 110.

The data output by the bypass unit 105 in accordance with this control signal 119 become the output data 118 of the image processing LSI 101.

The details of the operations of the above-described data processing system shall now be described.

First, the operations that are performed when the moving image data and graphics data that have been output from the CPU 102 are synthesized at the image processing LSI 101 and the synthesized image is displayed on the display device 103, that is, the image display operations that are performed when moving image communication is carried out shall be described.

First, the CPU 102 prepares the graphics data to be displayed on the display device 103 and the moving image coded data that have been coded in accordance with the MPEG-4 coding method.

The CPU 102 then outputs the prepared graphics data and moving image coded data to the image processing LSI 101 as the output data 114.

The graphics data to be output to image processing LSI 101 are input into the CPU 102 as an external input 113.

Alternatively, these graphics data are generated inside the CPU 102 in accordance with information input from the external input 113.

Meanwhile, the MPEG-4 coded data, which are the moving image data to be output to the image processing LSI 101, are image coded data input into the CPU 102 as the external input 113.

Alternatively, the results of multiplexing image coded data and coded data of sound, etc. are input as the external input 113 and the MPEG-4 coded data are the image coded data that have been separated inside the CPU 102.

The control device 110 controls the voltage regulating device 111 and the power supply interrupting unit 122 so that the power supply voltage 127 (power supply voltage VddB) is supplied to the region B that contains the image processing unit 104. The control device 110 also controls the clock generating device 112 and the clock interrupting unit 123 so that the clock 131 (clock ClkB) is supplied to the region B that contains the image processing unit 104.

This is because when moving image communication is being performed, a process of decoding the coded data of moving image and a process of synthesizing the decoded moving image data with graphics data, which place the greatest processing load on the system, become necessary.

The control device 110 also controls the switch 108 inside the bypass unit 105 so that the data 114 output from the CPU 102 will be transferred to the image processing unit 104.

The control device 110 also controls the selector 109 inside the bypass unit 105 so that the processing result data 116 at the image processing unit 104 will be output.

In the image processing LSI 101, the graphics data and the coded data, which are the output data 114 from the CPU 102, are transferred to the image processing unit 104 by the switch 108 of the bypass unit 105 in accordance with the control by the control device 110.

Upon receiving the graphics data and the coded data, the image processing unit 104 performs the decoding process on the coded data.

After decoding, the image processing unit 104 performs the process of synthesizing the decoded moving image data and the graphics data.

After the synthesizing process has been completed and the display image data have been prepared, the image processing unit 104 outputs the display image data 116 to the bypass unit 105.

The bypass unit 105 selects and outputs the received display image data 116 by means of the selector 109.

The display image data 116 are thereby output from the image processing LSI 101 to the image display device 103 as display image data 118.

The process is ended by the display device 103 displaying the received display image data.

Next, the operations that are performed when only graphics data output from the CPU 102 are to be displayed on the display device 103 shall be described.

First, the CPU 102 prepares the graphics data to be displayed on the display device 103.

The CPU 102 outputs the prepared graphics data to the image processing LSI 101.

With regard to image data, the output data 114 from the CPU 102 to the image processing LSI 101 in this case are only graphics data.

Whether or not the data are only graphics data is notified from the CPU 102 to the control device 110.

In the case where only graphics data, such as data for a menu display, time display, etc., are to be displayed, the moving image decoding process and the process of synthesizing moving image data with graphics data are unnecessary.

The control device 110 thus controls the voltage regulating device 111 and the power supply interrupting unit 122 or controls the clock generating device 112 and the clock interrupting unit 123 so that either the supplying of the power supply voltage 127 (power supply voltage VddB) to region B containing the image processing unit 104 or the supplying of the clock 131 (clock ClkB) to region B will be stopped.

The control device 110 also controls the switch 108 and the selector 109 so that the bypass unit 105 will transfer the output data 114 output from the CPU 102 directly to the display device 103.

In the image processing LSI 101, the graphics data from the CPU 102 are output as display image data 118 directly to the display device 103 via the bypass line 117 of bypass unit 105 in accordance with the control by the control device 110.

Figure 6:
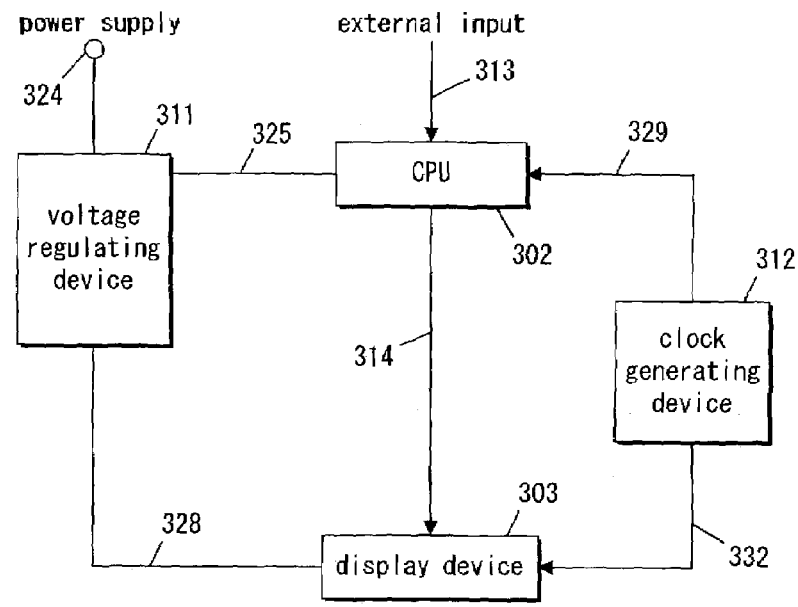
FIG. 6 is a diagram showing a prior-art data processing system that is an example of a case where only graphics data are handled.
Figure 7:
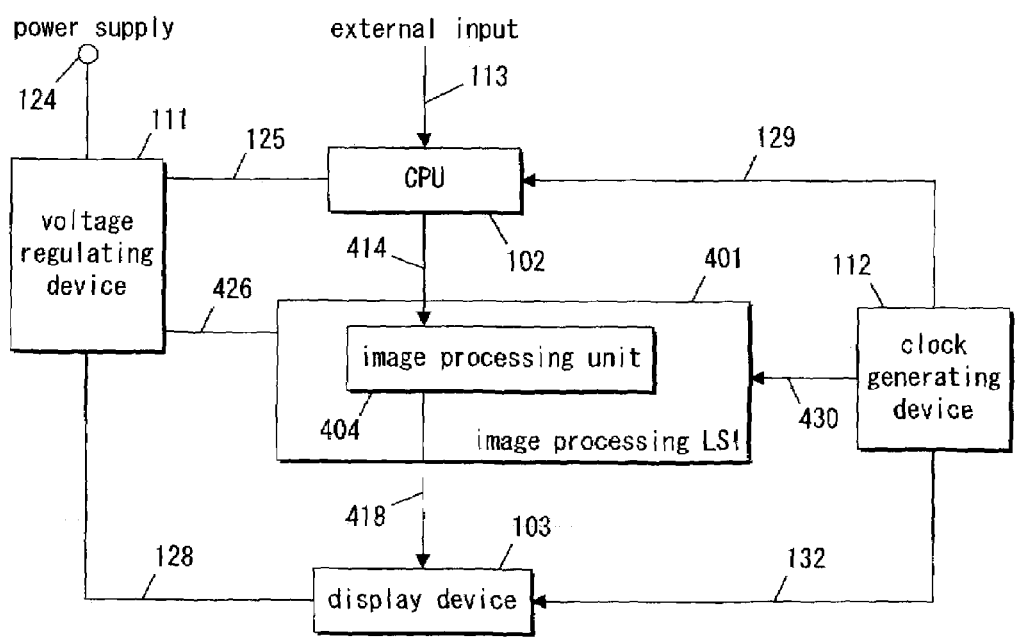
FIG. 7 is a diagram showing a prior-art data processing system that is an example of a case where moving images and graphics data are handled.

The data 118 transferred from the image processing LSI 101 to the display device 103 correspond to data 314 of FIG. 6.

The process is ended by the display device 103 displaying the received display image data.

As has been described above, with the first embodiment, the image processing unit 104, having the function of decoding MPEG-4 coded data and the function of synthesizing the decoded moving image data with graphics data, is realized, along with a bypass unit 105, by which graphics data can be bypassed around the image processing unit 104, on a single LSI.

Thus, in cases where only graphics data are to be displayed, the graphics data can be output to the display device 103 via the bypass line 117 and an operation which is equivalent to outputting the graphics data directly to the display device 103 from the CPU 102 can thus be performed.

Also, in cases where only graphics data are to be displayed, the supplying of the power supply voltage 127 (power supply voltage VddB) or the supplying of the clock 131 (clock ClkB) to the image processing unit 104 can be interrupted.

This enables wasteful leak currents in the image processing unit 104 to be restrained and charging/discharging of the clock line in the image processing unit 104 to be restrained.

Wasteful power consumption, such as power consumption due to leak currents and unnecessary power consumption due to charging/discharging of the clock line, can thus be reduced.

Also, in cases where only graphics data are to be displayed, only region A1, which contains the bypass unit 105, in the interior of the image processing LSI 101 is made to operate.

The frequency of the clock 130 (clock ClkA) supplied to region A1 can thus be set independent of the image processing unit 104 of region B.

The frequency of the clock 130 (clock ClkA) supplied to region A1 can thus be decreased flexibly. A further reduction of power consumption can be achieved by decreasing the clock frequency.

By the same reason, the level of the power supply voltage 126 (power supply voltage VddA) supplied to region A1 can be set independent of the image processing unit 104 of region B.

The level of the power supply voltage 126 (power supply voltage VddA) supplied to region A1 can thus be decreased flexibly. A further reduction of power consumption can be achieved by decreasing the voltage level.

Also, by not providing the bypass unit 105 on a circuit board onto which the above-described data processing system is mounted but by realizing the bypass unit 105 on a single LSI, the mounting area of the system as a whole can be made small.

That is, the bypass unit 105 can be provided without enlarging the area of a circuit board onto which the above-described data processing system is to be mounted.

Although a case where the image processing unit 104 and the bypass unit 105 are arranged in a single integrated circuit was described above, they do not have to be arranged in a single integrated circuit.

Also, in the above-described case, when the image processing unit 104 does not perform the decoding process on a moving image, one of either the supplying of the power supply voltage 127 (power supply voltage VddB) or the supplying of the clock 131 (clock ClkB) is interrupted to stop region B.

However, when the image processing unit 104 does not perform the decoding process on a moving image, both the supplying of the power supply voltage 127 (power supply voltage VddB) and the supplying of the clock 131 (clock ClkB) may be interrupted instead to stop region B.

Figure 2:
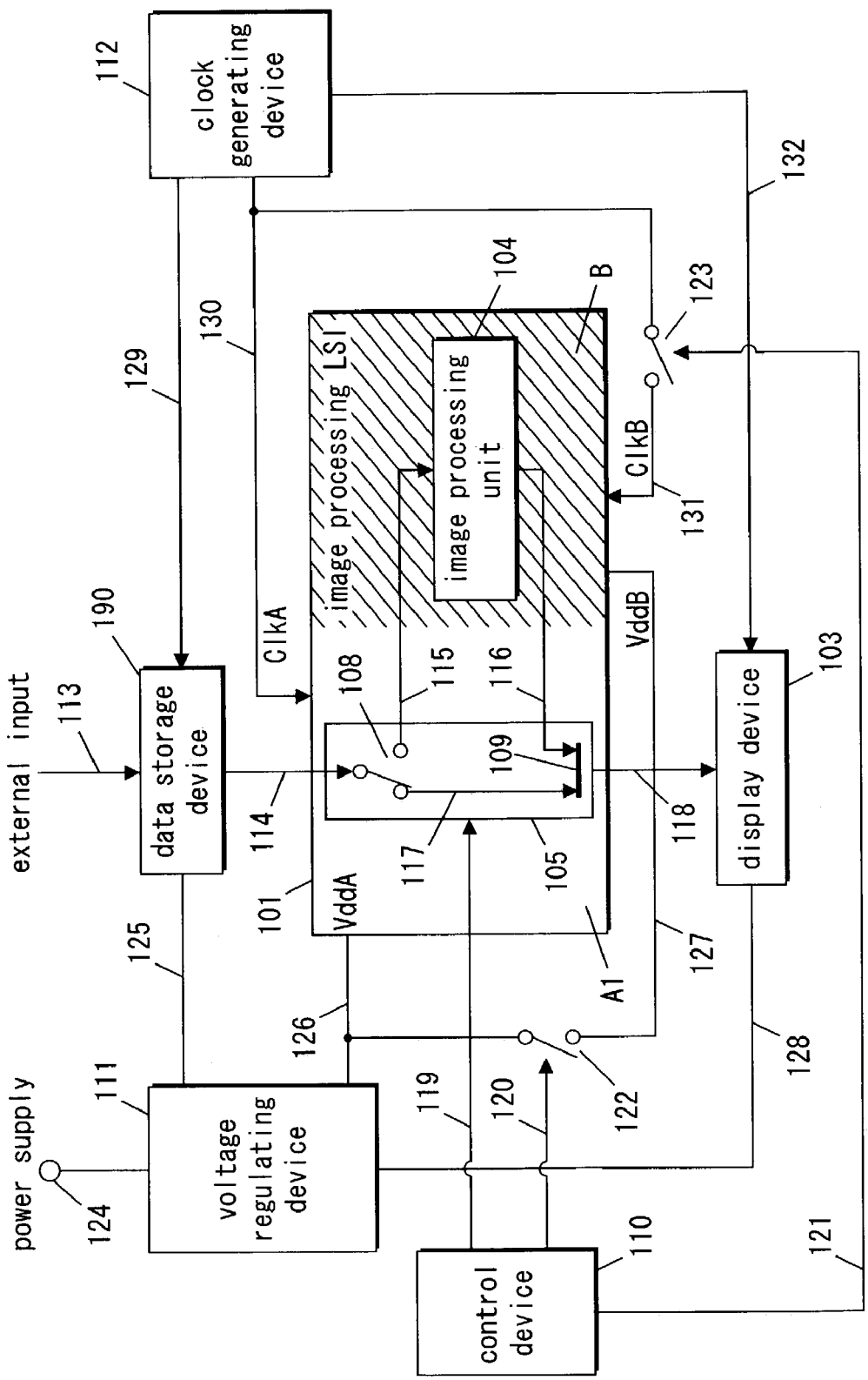
FIG. 2 is a diagram showing the general arrangement of a first modification example of the data processing system of the first embodiment of the present invention.

Also, although the CPU 102 is the prior-stage data processing unit that outputs data to the image processing LSI 101 in the above-described case, this data processing unit may instead be a data storage device 190 that stores graphics data and coded data, as shown in FIG. 2.

Figure 3:
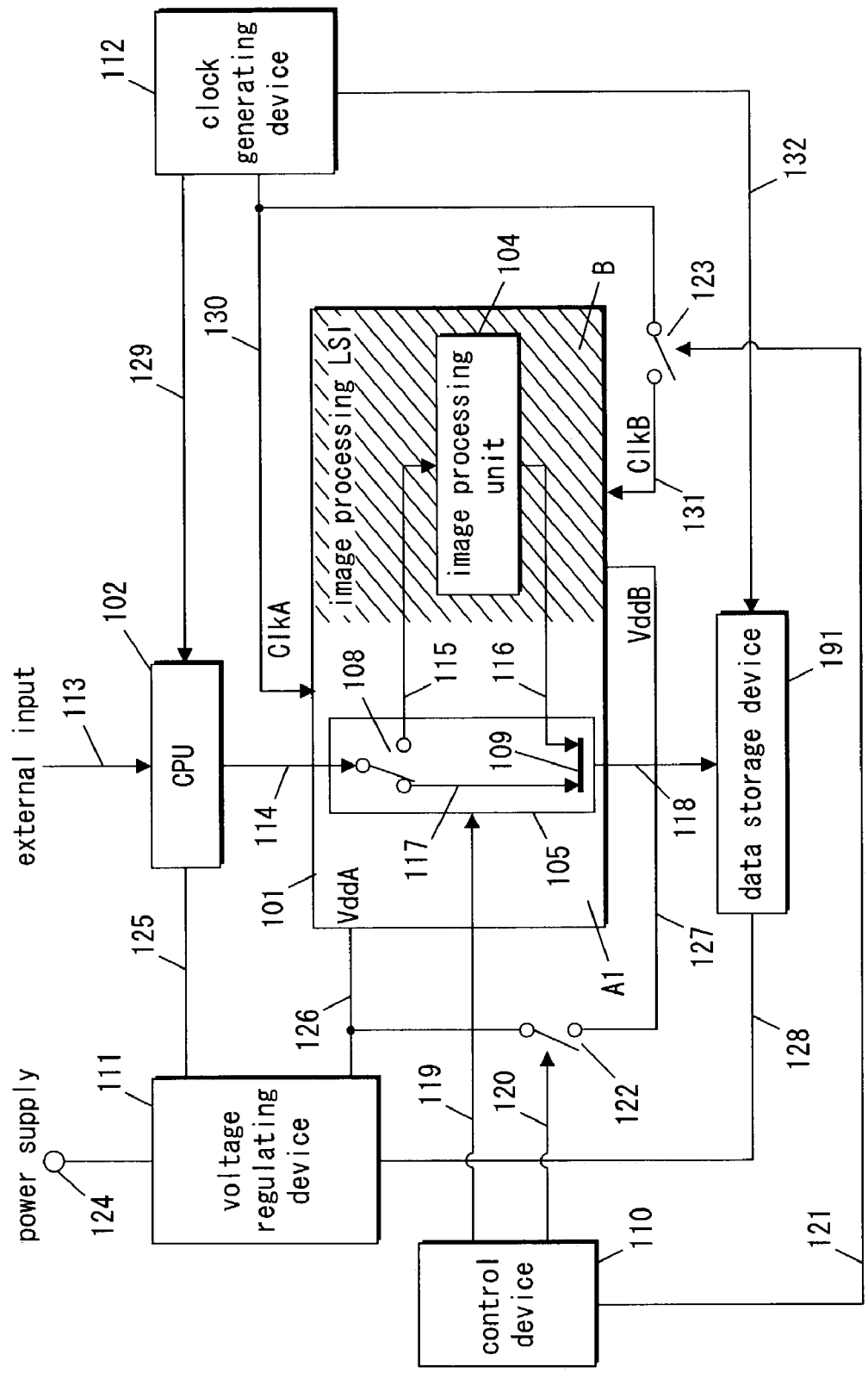
FIG. 3 is a diagram showing the general arrangement of a second modification example of the data processing system of the first embodiment of the present invention.

Also, although the display device 103 is the subsequent-stage data processing unit that receives data 114 from the image processing LSI 101 in the above-described case, this data processing unit may instead be a data storage device 191 that stores graphics data and synthesized image data, as shown in FIG. 3.

Also, the CPU 102 was described above as a CPU which is dedicated to image display. However, there may also be cases where the CPU 102 performs control of the entire system including image display.

In such a case, the control device 110 controls the stoppage of the image processing unit 104, the operation of the bypass unit 105, etc. under the control of the CPU 102.

Also, each of the CPU 102, region B, and display device 103 may be equipped in plurality in accordance with the data and processing contents.

Second Embodiment

Figure 4:
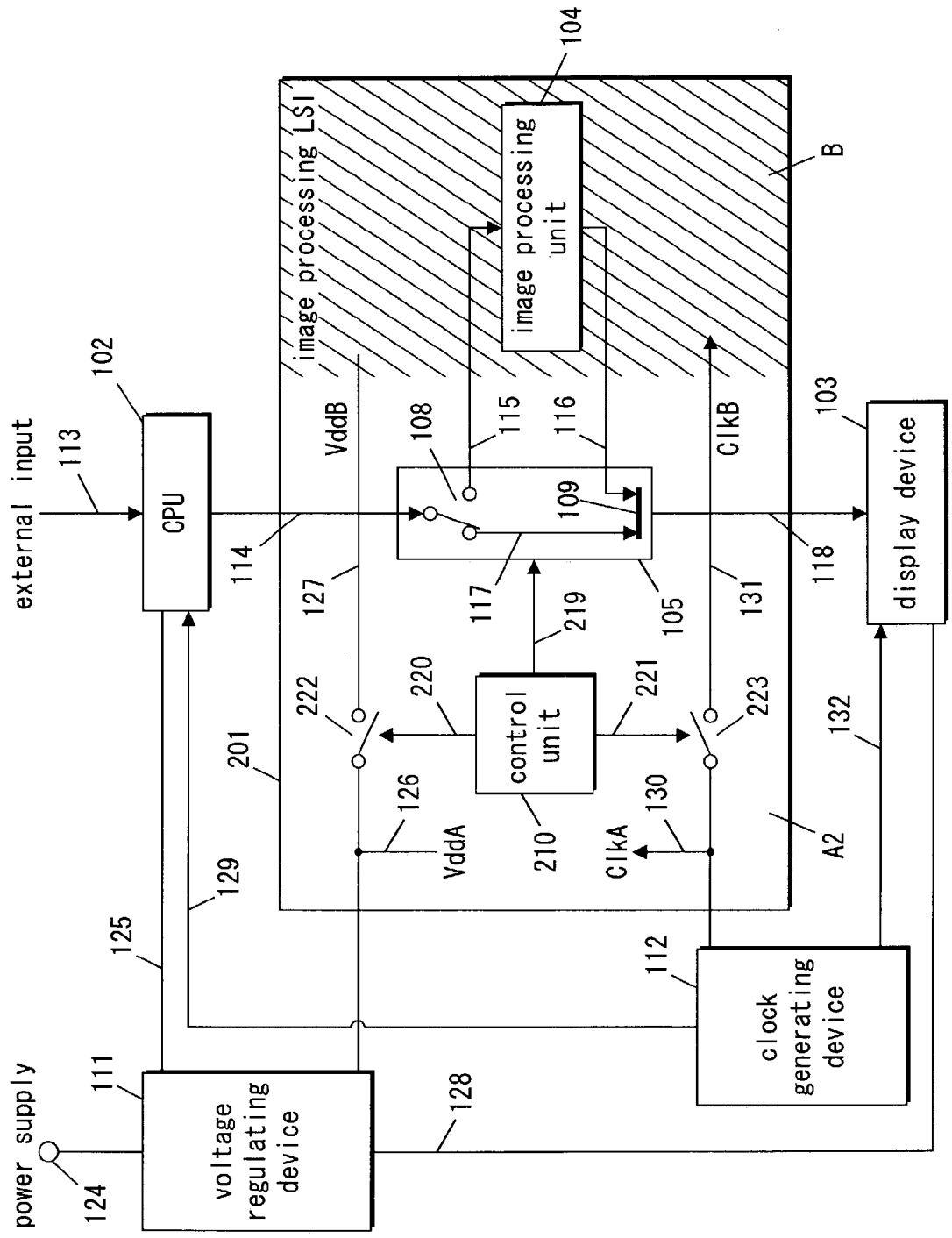
FIG. 4 is a diagram showing the general arrangement of a data processing system of a second embodiment of the present invention.

FIG. 4 is a block diagram, showing the arrangement of a data processing system of a second embodiment of the present invention.

The main point by which the arrangement of this embodiment differs from that of the first embodiment is that a control unit, which performs control of the supplying of a power supply voltage and a clock to region B and control of the bypass unit 105, is arranged in a single integrated circuit.

Since this embodiment is the same as the first embodiment in points besides the above, the components shown in FIG. 4 that are the same as those of FIG. 1 are provided with the same symbols.

As shown in FIG. 4, this data processing system is equipped with an image processing LSI 201, a display device 103, a general-purpose processor (CPU) 102, a voltage regulating device 111, a clock generating device 112, a power supply interrupting unit 222, and a clock interrupting unit 223.

The image processing LSI 201 comprises an image processing unit 104, a bypass unit 105, and a control unit 210. The bypass unit 105 comprises a switch 108, a bypass line 117, and a selector 109.

The operations of the above-mentioned components shall now be described.

The image processing unit 104 of the image processing LSI 201 decodes coded data that have been coded in accordance with the MPEG-4 coding method.

The image processing unit 104 then synthesizes the decoded moving image with graphics data.

The bypass unit 105 of the image processing LSI 201 is used when graphics data are to be displayed without using the image processing unit 104.

That is, the bypass unit 105 outputs graphics data upon bypassing the image processing unit 104.

The display device 103 receives the display image data generated at the image processing LSI 201 and displays the received display image data. The display device 103 is, for example, a liquid crystal display, etc.

The CPU 102 prepares graphics data to be displayed on the display device 103 and sends the prepared graphics data to the image processing LSI 201.

Also, when a moving image is to be displayed on the display device 103, the CPU 102 sends the coded data of the moving image to be displayed to the image processing LSI 201.

The voltage regulating device 111 adjusts a voltage generated by a system power supply 124 to appropriate voltages and supplies these appropriate voltages as power supply voltages to the image processing LSI 201, CPU 102, and display device 103.

The clock generating device 112 supplies appropriate clocks to the image processing LSI 201, CPU 102, and display device 103.

The CPU 102 operates by a power supply voltage 125, which is supplied from the voltage regulating device 111, and a clock 129, which is supplied from the clock generating device 112.

The display device 103 operates by a power supply voltage 128, which is supplied from the voltage regulating device 111, and a clock 132, which is supplied from the clock generating device 112.

The image processing LSI 201 is divided into the two regions of a region A2, which contains the bypass unit 105 and control unit 210, and a region B (slanted line part in FIG. 4), which contains the image processing unit 104.

The region A2, which contains the bypass unit 105 and control unit 210, operates by a power supply voltage 126 (power supply voltage VddA), which is supplied from the voltage regulating device 111, and a clock 130 (clock ClkA), which is supplied from the clock generating device 112.

The region B, which contains the image processing unit 104, operates by a power supply voltage 127 (power supply voltage VddB), which is supplied from the voltage regulating device 111, and a clock 131 (clock ClkB), which is supplied from the clock generating device 112.

The control unit 210 of the image processing LSI 201 performs control of the supplying of the power supply voltage 127 (power supply voltage VddB) to region B (slanted line part in FIG. 4) inside the image processing LSI 201, control of the supplying of the clock 131 (clock ClkB) to region B, and control of the bypass unit 105.

The power supply interrupting unit 222 performs interruption of the power supply voltage in accordance with a control signal 220 from the control unit 210.

The clock interrupting unit 223 performs interruption of the clocks in accordance with a control signal 221 from the control unit 210.

The operations of the respective components of the bypass unit 105 shall now be described.

The bypass line 117 outputs output data 114 from the CPU 102 directly to the display device 103.

The switch 108 switches between a path, by which the output data 114 from the CPU 102 are output as input data 115 for the image processing unit 104, and a path, by which the output data 114 from the CPU 102 are output to the bypass line 117.

The selector 109 selects between and outputs either the processing result data 116 at the image processing unit 104 or the data output from the bypass line 117.

The switch 108 and selector 109 are controlled by a control signal 219 from the control unit 210.

The data output by the bypass unit 105 in accordance with this control signal 219 become the output data 118 of the image processing LSI 201.

The details of the operations of the above-described data processing system shall now be described.

First, the operations that are performed when the moving image data and graphics data that have been output from the CPU 102 are synthesized at the image processing LSI 201 and the synthesized image is displayed on the display device 103, that is, the image display operations that are performed when moving image communication is carried out shall be described.

First, the CPU 102 prepares the graphics data to be displayed on the display device 103 and the moving image coded data that have been coded in accordance with the MPEG-4 coding method.

The CPU 102 then outputs the prepared graphics data and moving image coded data to the image processing LSI 201 as the output data 114.

The graphics data to be output to the image processing LSI 201 are input into the CPU 102 as an external input 113.

Alternatively, these graphics data are generated inside the CPU 102 in accordance with information input from the external input 113.

Meanwhile, the MPEG-4 coded data, which are the moving image data to be output to the image processing LSI 201, are image coded data input into the CPU 102 as the external input 113.

Alternatively, the results of multiplexing image coded data and coded data of sound, etc. are input as the external input 113 and the MPEG-4 coded data are the image coded data that have been separated inside the CPU 102.

The control unit 210 controls the voltage regulating device 111 and the power supply interrupting unit 222 so that the power supply voltage 127 (power supply voltage VddB) is supplied to the region B that contains the image processing unit 104. The control unit 210 also controls the clock generating device 112 and the clock interrupting unit 223 so that the clock 131 (clock ClkB) is supplied to the region B that contains the image processing unit 104.

This is because when moving image communication is being performed, a process of decoding the coded data of a moving image and a process of synthesizing the decoded moving image data with graphics data, which place the greatest processing load on the system, become necessary.

The control unit 210 also controls the switch 108 inside the bypass unit 105 so that the output data 114 output from the CPU 102 will be transferred to the image processing unit 104.

The control unit 210 also controls the selector 109 inside the bypass unit 105 so that the processing result data 116 at the image processing unit 104 will be output.

In the image processing LSI 201, the graphics data and the coded data, which are the output data 114 from the CPU 102, are transferred to the image processing unit 104 by the switch 108 of the bypass unit 105 in accordance with the control by control unit 210.

Upon receiving the graphics data and the coded data, the image processing unit 104 performs the decoding process on the coded data.

After decoding, the image processing unit 104 performs the process of synthesizing the decoded moving image data and the graphics data.

After the synthesizing process has been completed and the display image data have been prepared, the image processing unit 104 outputs the display image data 116 to the bypass unit 105.

The bypass unit 105 selects and outputs the received display image data 116 by means of the selector 109.

The display image data 116 are thereby output from the image processing LSI 201 to the image display device 103 as the display image data 118.

The process is ended by the display device 103 displaying the received display image data 118.

Next, the operations that are performed when only graphics data output from the CPU 102 are to be displayed by the display device 103 shall be described.

First, the CPU 102 prepares the graphics data to be displayed on the display device 103.

The CPU 102 outputs the prepared graphics data to the image processing LSI 201.

With regard to image data, the output data 114 from the CPU 102 to the image processing LSI 201 in this case are only graphics data.

Whether or not the data are only graphics data is notified from the CPU 102 to the control unit 210.

In the case where only graphics data, such as data for a menu display, time display, etc., are to be displayed, the moving image decoding process and the process of synthesizing moving image data with graphics data are unnecessary.

The control unit 210 thus controls the voltage regulating device 11 and power supply interrupting unit 222 or controls the clock generating device 112 and clock interrupting unit 223 so that either the supplying of the power supply voltage 127 (power supply voltage VddB) to region B containing the image processing unit 104 or the supplying of the clock 131 (clock ClkB) to region B will be stopped.

The control unit 210 also controls the switch 108 and the selector 109 so that the bypass unit 105 will transfer the output data 114 output from the CPU 102 directly to the display device 103.

In the image processing LSI 201, the graphics data from the CPU 102 are output as display image data 118 directly to the display device 103 via the bypass line 117 of the bypass unit 105 in accordance with the control by the control unit 210.

The data 118 transferred from the image processing LSI 201 to the display device 103 correspond to data 314 of FIG. 6.

The process is ended by the display device 103 displaying the received display image data.

As has been described above, in accordance with the second embodiment, the image processing unit 104, having the function of decoding MPEG-4 coded data and the function of synthesizing the decoded moving image data with graphics data, is realized, along with the bypass unit 105, by which graphics data can be bypassed around the image processing unit 104, and the control unit 210 on a single LSI.

Thus, in cases where only graphics data are to be displayed, the graphics data can be output to the display device 103 via the bypass line 117 and an operation which is equivalent to outputting the graphics data directly to the display device 103 from the CPU 102 can thus be performed.

Also, in cases where only graphics data are to be displayed, the supplying of the power supply voltage 127 (power supply voltage VddB) or the supplying of the clock 131 (clock ClkB) to the image processing unit 104 can be interrupted.

This enables wasteful leak currents in the image processing unit 104 to be restrained and charging/discharging of the clock line in the image processing unit 104 to be restrained.

Wasteful power consumption, such as power consumption due to leak currents and unnecessary power consumption due to charging/discharging of the clock line, can thus be reduced.

Also, in cases where only graphics data are to be displayed, only region A2, which contains the bypass unit 105, in the interior of the image processing LSI 201 is made to operate.

The frequency of the clock 130 (clock ClkA) supplied to region A2 can thus be set independent of the image processing unit 104 of region B.

The frequency of the clock 130 (clock ClkA) supplied to region A2 can thus be decreased flexibly. A further reduction of power consumption can be achieved by decreasing the clock frequency.

By the same reason, the level of the power supply voltage 126 (power supply voltage VddA) supplied to region A2 can be set independent of the image processing unit 104 of region B.

The level of the power supply voltage 126 (power supply voltage VddA) supplied to region A2 can thus be decreased flexibly. A further reduction of power consumption can be achieved by decreasing the voltage level.

Also, by realizing the bypass unit 105 and the control unit 210 on a single LSI, the mounting area of the system as a whole can be made even smaller than in the first embodiment.

Also, in the above-described case, when the image processing unit 104 does not perform the decoding process on a moving image, one of either the supplying of the power supply voltage 127 (power supply voltage VddB) or the supplying of the clock 131 (clock ClkB) is interrupted to stop region B.

However, when the image processing unit 104 does not perform the decoding process on a moving image, both the supplying of the power supply voltage 127 (power supply voltage VddB) and the supplying of the clock 131 (clock ClkB) may instead be interrupted to stop region B.

Also, although the CPU 102 is the prior-stage data processing unit that outputs data 114 to the image processing LSI 201 in the above-described case, the data storage device 190 of FIG. 2 may be provided in place of this CPU 102.

Also, although the display device 103 is the subsequent-stage data processing unit that receives data 118 from the image processing LSI 201 in the above-described case, the data storage device 191 of FIG. 3 may be provided in place of this display device 103.

Also, the CPU 102 was described above as a CPU which is dedicated to image display. However, there may also be cases where the CPU 102 performs control of the entire system including image display.

In such a case, the control unit 210 controls the stoppage of the image processing unit 104, the operation of bypass unit 105, etc. under the control of the CPU 102.

Also, each of the CPU 102, region B, and display device 103 may be equipped in plurality in accordance with the data and processing contents.

Third Embodiment

Figure 5:
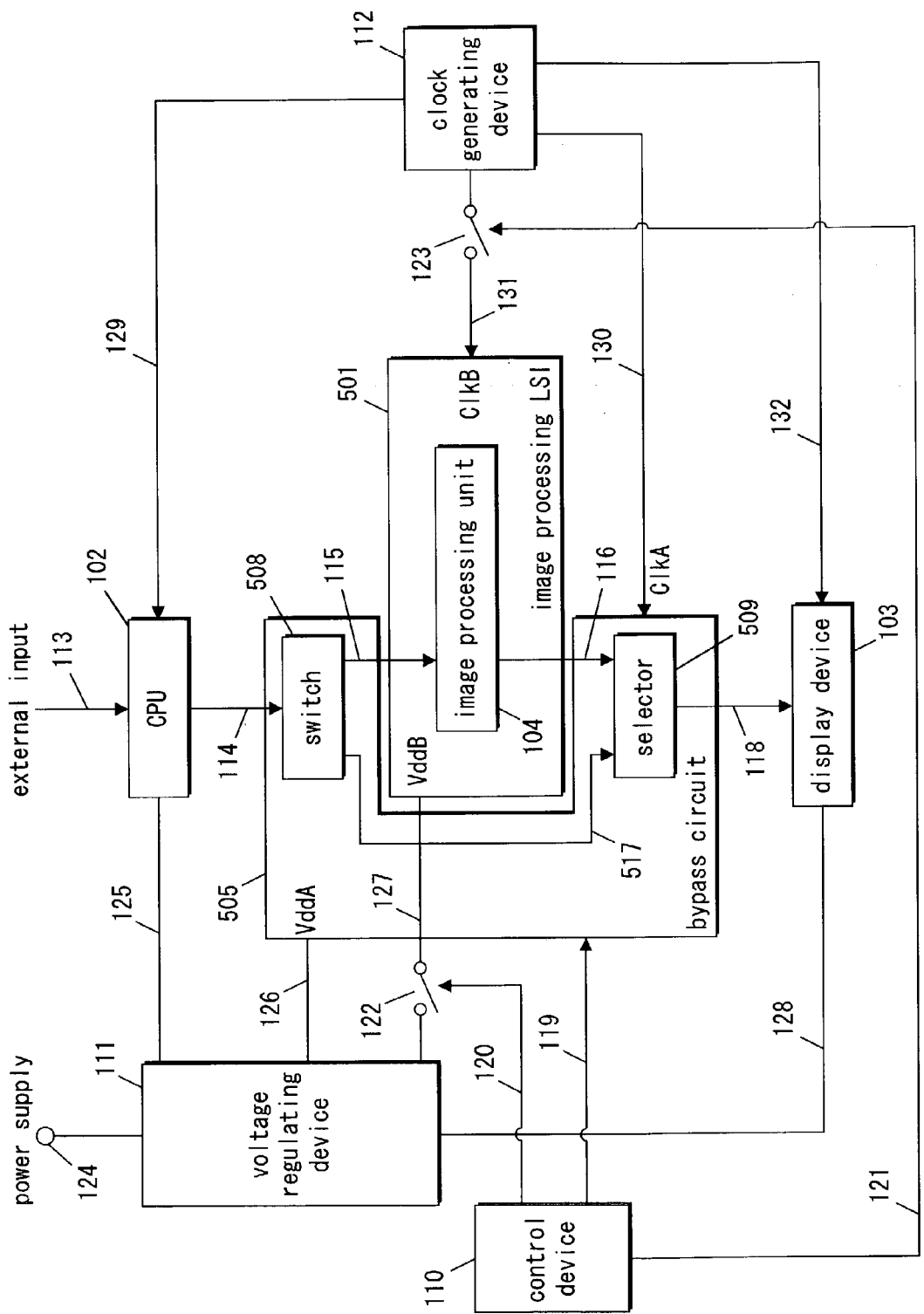
FIG. 5 is a diagram showing the general arrangement of a data processing system of a third embodiment of the present invention.

FIG. 5 is a block diagram showing the arrangement of a data processing system of a third embodiment of the present invention. In FIG. 5, the parts that are the same as those of FIG. 1 are provided with the same symbols and descriptions thereof shall be omitted where suitable.

As shown in FIG. 5, this data processing system is equipped with an image processing LSI 501, a display device 103, a general-purpose processor (CPU) 102, a voltage regulating device 111, a clock generating device 112, a control device 110, a power supply interrupting unit 122, a clock interrupting unit 123, and a bypass circuit 505.

The image processing LSI 501 comprises an image processing unit 104.

The bypass circuit 505 comprises a switch 508, a bypass line 517, and a selector 509.

The respective operations of the above-mentioned components shall now be described, mainly in regard to the points of difference with respect to the first embodiment.

The bypass circuit 505 is used when graphics data are to be displayed without using the image processing unit 104.

That is, the bypass circuit 505 outputs graphics data upon bypassing the image processing unit 104.

The voltage regulating device 111 adjusts a voltage generated by a system power supply 124 to appropriate voltages and supplies these appropriate voltages as power supply voltages to the image processing LSI 501, CPU 102, display device 103, and bypass circuit 505.

The clock generating device 112 supplies appropriate clocks to the image processing LSI 501, CPU 102, display device 103, and bypass circuit 505.

The image processing LSI 501, which contains the image processing unit 104, operates by a power supply voltage 127 (power supply voltage VddB), which is supplied from the voltage regulating device 111, and a clock 131 (clock ClkB), which is supplied from the clock generating device 112.

The bypass circuit 505 operates by a power supply voltage 126 (power supply voltage VddA), which is supplied from the voltage regulating device 111, and a clock 130 (clock ClkA), which is supplied from the clock generating device 112.

The control device 110 performs control of the supplying of the power supply voltage 127 (power supply voltage VddB) to the image processing LSI 501, control of the supplying of the clock 131 (clock ClkB) to image processing LSI 501, and control of the bypass circuit 505.

The operations of the respective components of the bypass circuit 505 shall now be described.

The bypass line 517 outputs output data 114 from the CPU 102 directly to the display device 103.

The switch 508 switches between a path, by which the output data 114 from the CPU 102 are output as input data 115 for the image processing unit 104, and a path, by which the output data 114 from the CPU 102 are output to the bypass line 517.

The selector 509 selects between and outputs either the processing result data 116 at the image processing unit 104 or the data output from the bypass line 517.

The switch 508 and selector 509 are controlled by a control signal 119 from the control device 110.

The data output by the bypass circuit 505 in accordance with this control signal 119 become the input data 118 for the display device 103.

The details of the operations of the above-described data processing system shall now be described.

First, the operations that are performed when the moving image data and graphics data that have been output from the CPU 102 are synthesized at the image processing LSI 501 and the synthesized image is displayed on the display device 103, that is, the image display operations that are performed when moving image communication is carried out shall be described.

First, the CPU 102 prepares the graphics data to be displayed on the display device 103 and the moving image coded data that have been coded in accordance with the MPEG-4 coding method.

The CPU 102 then outputs the prepared graphics data and moving image coded data to the bypass circuit 505 as the output data 114.

The control device 110 controls the voltage regulating device 111 and the power supply interrupting unit 122 so that the power supply voltage 127 (power supply voltage VddB) is supplied to the image processing LSI 501 that contains the image processing unit 104. The control device 110 also controls the clock generating device 112 and the clock interrupting unit 123 so that the clock 131 (clock ClkB) is supplied to the image processing LSI 501 that contains the image processing unit 104.

The control device 110 also controls the switch 508 provided inside the bypass circuit 505 so that the output data 114 output from the CPU 102 will be transferred to the image processing unit 104.

The control device 110 also controls the selector 509 provided inside the bypass circuit 505 so that the processing result data 116 at the image processing unit 104 will be output.

The graphics data and the coded data, which are the output data 114 from the CPU 102, are transferred to the image processing unit 104 by the switch 508 of the bypass circuit 505 in accordance with the control by the control device 110.

Upon receiving the graphics data and the coded data, the image processing unit 104 performs a decoding process on the coded data.

After decoding, the image processing unit 104 performs a process of synthesizing the decoded moving image data and the graphics data.

After the synthesizing process has been completed and the display image data have been prepared, the image processing unit 104 outputs the display image data 116 to the bypass circuit 505.

The bypass circuit 505 selects and outputs the received display image data 116 by means of the selector 509.

The display image data 116 are thereby output from the image processing LSI 501 to the image display device 103 as the display image data 118.

The process is ended by the display device 103 displaying the received display image data 116.

Next, the operations that are performed when only graphics data output from CPU 102 are to be displayed on the display device 103 shall be described.

First, the CPU 102 prepares the graphics data to be displayed on the display device 103.

The CPU 102 outputs the prepared graphics data to the bypass circuit 505.

With regard to image data, the output data 114 from the CPU 102 to the bypass circuit 505 in this case are only graphics data.

Whether or not the data are only graphics data is notified from the CPU 102 to the control device 110.

In the case where only graphics data, such as data for a menu display, time display, etc., are to be displayed, the moving image decoding process and the process of synthesizing moving image data with graphics data are unnecessary.

The control device 110 thus controls the voltage regulating device 111 and the power supply interrupting unit 122 or controls the clock generating device 112 and the clock interrupting unit 123 so that either the supplying of the power supply voltage 127 (power supply voltage VddB) to the image processing LSI 501, which contains the image processing unit 104, or the supplying of the clock 131 (clock ClkB) to the image processing LSI 501 will be stopped.

The control device 110 also controls the switch 508 and the selector 509 so that the bypass circuit 505 will transfer the output data 114 output from the CPU 102 directly to the display device 103.

The graphics data from the CPU 102 are thus output as display image data 118 directly to the display device 103 via the bypass line 517 of the bypass circuit 505 in accordance with the control by the control device 110.

The data 118 transferred from the bypass circuit 505 to the display device 103 correspond to data 314 of FIG. 6.

The process is ended by the display device 103 displaying the received display image data 118.

As has been described above, in accordance with the third embodiment, an image processing unit 104, having the function of decoding MPEG-4 coded data and the function of synthesizing the decoded moving image data with graphics data, is provided along with a bypass circuit 505, by which graphics data can be bypassed around the image processing unit 104.

Thus, in cases where only graphics data are to be displayed, the graphics data can be output to the display device 103 via the bypass line 517 and an operation which is equivalent to outputting the graphics data directly to the display device 103 from the CPU 102 can thus be performed.

Also, in cases where only graphics data are to be displayed, the supplying of the power supply voltage 127 (power supply voltage VddB) or the supplying of the clock 131 (clock ClkB) to the image processing unit 104 can be interrupted.

This enables wasteful leak currents in the image processing unit 104 to be restrained and charging/discharging of the clock line in the image processing unit 104 to be restrained.

Wasteful power consumption, such as power consumption due to leak currents and unnecessary power consumption due to charging/discharging of the clock line, can thus be reduced.

Since the clock 130 (clock ClkA) and clock 131 (clock ClkB) are generated separately, the frequency of the clock 130 (clock ClkA) supplied to the bypass circuit 505 can be decreased flexibly. A further reduction of power consumption can be achieved by decreasing the clock frequency.

Also, since the power supply voltage 126 (power supply voltage VddA) and power supply voltage 127 (power supply voltage VddB) are generated separately, the level of power supply voltage 126 (power supply voltage VddA) supplied to the bypass circuit 505 can be decreased flexibly. A further reduction of power consumption can be achieved by decreasing the voltage level.

Also, in the above-described case, when the image processing unit 104 does not perform the decoding process on a moving image, one of either the supplying of the power supply voltage 127 (power supply voltage VddB) or the supplying of the clock 131 (clock ClkB) is interrupted to stop the image processing LSI 501.

However, when the image processing unit 104 does not perform the decoding process on a moving image, both the supplying of the power supply voltage 127 (power supply voltage VddB) and the supplying of the clock 131 (clock ClkB) may instead be interrupted to stop the image processing LSI 501.

Also, although the CPU 102 is the prior-stage data processing unit that outputs data 114 to the bypass circuit 505 in the above-described case, the data storage device 190 of FIG. 2 may be provided in place of this CPU 102.

Also, although the display device 103 is the subsequent-stage data processing unit that receives data 118 from the bypass circuit 505 in the above-described case, the data storage device 191 of FIG. 3 may be provided in place of this display device 103.

Also, the CPU 102 was described above as a CPU dedicated to image display. However, there may also be cases where the CPU 102 performs control of the entire system including image display.

In such a case, the control device 110 controls the stoppage of the image processing unit 104, the operation of the bypass circuit 505, etc. under the control of the CPU 102.

Also, each of the CPU 102, image processing LSI 501, and display device 103 may be equipped in plurality in accordance with the data and processing contents.

Having described preferred embodiments of the present invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A data processing system comprising:
   at least one first data processing unit operable to perform preprocessing and output preprocessed data;
   at least one second data processing unit operable to perform data processing on the preprocessed data and output processing result data;
   at least one third data processing unit operable to perform postprocessing on the processing result data;
   a switch operable to switch between a path by which the preprocessed data are output as input data for said second data processing unit, and a path by which the preprocessed data are output to a bypass line;
   a selector operable to select between and output either the processing resulting data or data output from the bypass line;
   a bypass unit operable to transfer the preprocessed data input from said first data processing unit to one of said second data processing unit and said third data processing unit;
   a control unit operable to control said bypass unit;
   a voltage regulating device operable to supply a power supply voltage to said second data processing unit;
   a clock generating device operable to supply a clock to said second data processing unit;
   a power supply interrupting unit operable to interrupt the power supply voltage supplied to said second data processing unit in accordance with a first instruction from said control unit; and
   a clock interrupting unit operable to interrupt the clock supplied to said second data processing unit in accordance with a second instruction from said control unit;
   wherein in a case where processing of the preprocessed data by said second data processing unit is not required, said bypass unit is operable to transfer the input preprocessed data to said third data processing unit in accordance with a third instruction from said control unit, and
   wherein in a case where processing of the preprocessed data by said second data processing unit is not required, said control unit is operable to stop said second data processing unit by interrupting at least one of the power supply voltage and the clock.

2. The data processing system as set forth in claim 1, wherein said second data processing unit and said bypass unit are arranged within a single integrated circuit.

3. The data processing system as set forth in claim 1, wherein said second data processing unit, said bypass unit, and said control unit are arranged within a single integrated circuit.

4. The data processing system as set forth in claim 1, wherein said first data processing unit is a processor.

5. The data processing system as set forth in claim 1, wherein said first data processing unit is a data storage device.

6. The data processing system as set forth in claim 1, wherein said third data processing unit is a display device.

7. The data processing system as set forth in claim 1, wherein said third data processing unit is a data storage device.

8. The data processing system as set form in claim 1, wherein said voltage regulating device is operable to supply a power supply voltage to at least one of said first data processing unit and said third data processing unit.

9. The data processing system as set forth in claim 1, wherein said clock generating device is operable to supply a clock to at least one of said first data processing unit and said third data processing unit.

10. A data processing system comprising:
    a bypass unit operable to output input data to either a first path or a second path;
    at least one data processing unit operable to perform data processing on the data output to the second path and output processing result data;
    a switch operable to switch between a path by which preprocessed data are output as input data for said data processing unit, and a path by which the preprocessed data are output to a bypass line;
    a selector operable to select between and output either the processing result data or data output from the bypass line;
    a voltage regulating device operable to supply a power supply voltage to said data processing unit;
    a clock generating device operable to supply a clock to said data processing unit;
    a power supply interrupting unit operable to interrupt the power supply voltage to said data processing unit by a control signal; and a clock interrupting unit operable to interrupt the clock to said second data processing unit by the control signal;

wherein in a case where the data input into said bypass unit are not required to be processed by said data processing unit, said bypass unit is operable to output the input data to the first path, which is not connected to said data processing unit, and wherein in a case where the data input into said bypass unit are not required to be processed by said data processing unit, said data processing unit is operable to stop by the interruption of at least one of the power supply voltage and the clock.

11. The data processing system as set forth in claim 10, wherein said data processing unit and said bypass unit are arranged within a single integrated circuit.

12. A data processing system comprising:

a bypass unit operable to output input data to either a first path or a second path;

a control unit operable to control said bypass unit; and at least one data processing unit operable to perform data processing on the data output to the second path and output processing result data;

a switch operable to switch between a path by which preprocessed data are output as input data for said data processing unit, and a path by which the preprocessed data are output to a bypass line;

a selector operable to select between and output either the processing result data or data output from the bypass line;

a voltage regulating device operable to supply a power supply voltage to said data processing unit;

a clock generating device operable to supply a clock to said data processing unit;

a power supply interrupting unit operable to interrupt the power supply voltage to said data processing unit based on a first control signal from said control unit; and a clock interrupting unit operable to interrupt the clocks to said data processing unit based on a second control signal from said control unit;

wherein in a case where the data input into said bypass unit are not required to be processed by said data processing unit, said bypass unit is operable to output the input data to the first path, which is not connected to said data processing unit, in accordance with an instruction of said control unit, and wherein in a case where the data input into said bypass unit are not required to be processed by said data processing unit, said control unit is operable to stop said data processing unit by interrupting at least one of the power supply voltage and the clock.

13. The data processing system as set forth in claim 12, wherein said data processing unit, said bypass unit, and said control unit are arranged within a single integrated circuit.

* * * * *